United States Patent [19]
Mackay et al.

[11] Patent Number: 5,042,823
[45] Date of Patent: * Aug. 27, 1991

[54] LAMINATED FINGER SEAL

[75] Inventors: Charles G. Mackay, Scottsdale; E. Scott Wright, Mesa, both of Ariz.

[73] Assignee: Allied-Signal Inc., Morris Township, Morris County, N.J.

[*] Notice: The portion of the term of this patent subsequent to Jul. 16, 2008 has been disclaimed.

[21] Appl. No.: 454,815

[22] Filed: Dec. 21, 1989

[51] Int. Cl.⁵ ............................................. F16J 15/48
[52] U.S. Cl. ...................................... 277/53; 277/57
[58] Field of Search ................................. 277/53–58, 277/96.1, 152, 153, 148, 159

[56] References Cited

U.S. PATENT DOCUMENTS

| | | |
|---|---|---|
| 885,032 | 4/1908 | De Ferranti . |
| 2,124,108 | 7/1938 | Grece . |
| 2,233,579 | 3/1941 | Bowers ........................... 277/235 R |
| 2,571,817 | 10/1951 | Armstrong . |
| 2,699,349 | 1/1955 | Brownlee . |
| 3,199,878 | 8/1965 | Cunningham et al. . |
| 3,381,969 | 5/1968 | Crow et al. . |
| 3,411,794 | 11/1968 | Allen . |
| 3,719,365 | 3/1973 | Emmerson et al. . |
| 3,843,278 | 10/1974 | Torell . |
| 3,880,435 | 4/1975 | Thornbald . |
| 3,970,319 | 7/1976 | Carroll et al. . |
| 4,202,554 | 5/1980 | Snell ..................................... 277/53 |
| 4,358,120 | 11/1982 | Moore .................................. 277/53 |
| 4,600,202 | 7/1986 | Schaeffler et al. ..................... 277/53 |
| 4,645,217 | 2/1987 | Honeycutt, Jr. et al. . |
| 4,678,113 | 7/1987 | Bridges et al. . |
| 4,756,536 | 7/1988 | Belcher . |
| 4,940,080 | 7/1990 | Reeves et al. ......................... 277/53 |

FOREIGN PATENT DOCUMENTS

| | | |
|---|---|---|
| 554053 | 7/1932 | Fed. Rep. of Germany . |
| 1300449 | 12/1962 | France . |
| 1308424 | 2/1963 | France . |

OTHER PUBLICATIONS

Technical Paper Entitled "Brushes as High Performance Gas Turbine-Seals" by J. G. Ferguson.

Primary Examiner—William A. Cuchlinski, Jr.
Assistant Examiner—Daniel G. DePumpo
Attorney, Agent, or Firm—Terry L. Miller; Jerry J. Holden; Robert A. Walsh

[57] ABSTRACT

An annular seal apparatus of the labyrinth type includes at least a pair of axially stacked thin diaphragm members. Each of diaphragm members includes a planar array of radially and circumferentially extending fingers separated by gaps. The pair of diaphragm members are disposed so that the fingers of each block the gaps of the other to define an axially extending annular labyrinth.

19 Claims, 3 Drawing Sheets

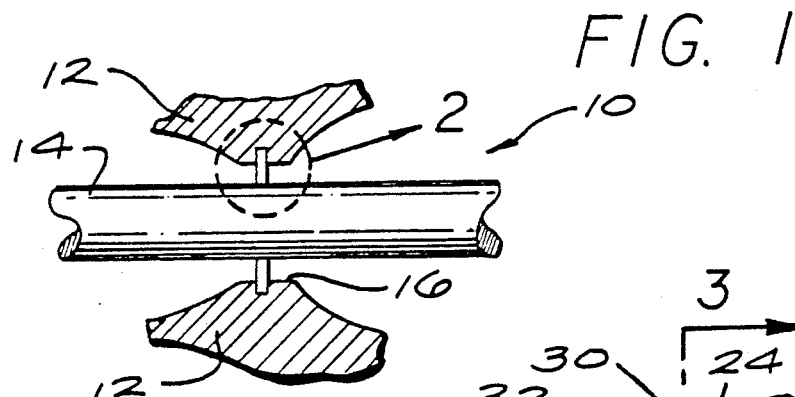
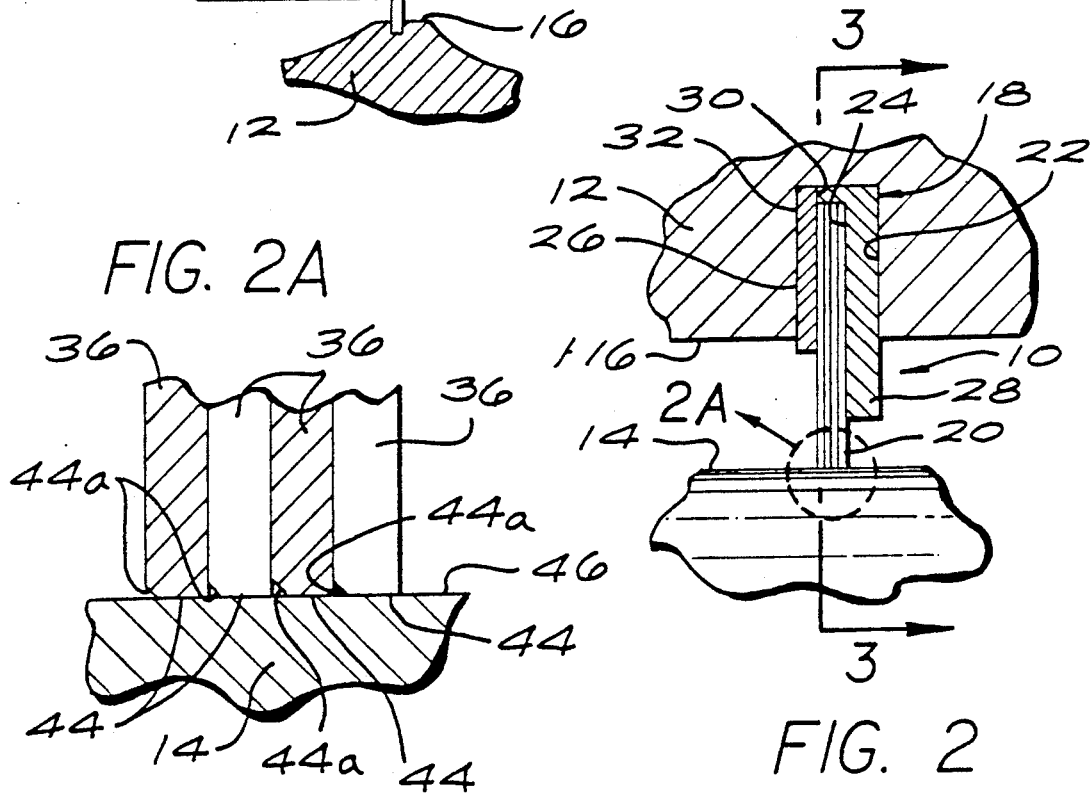
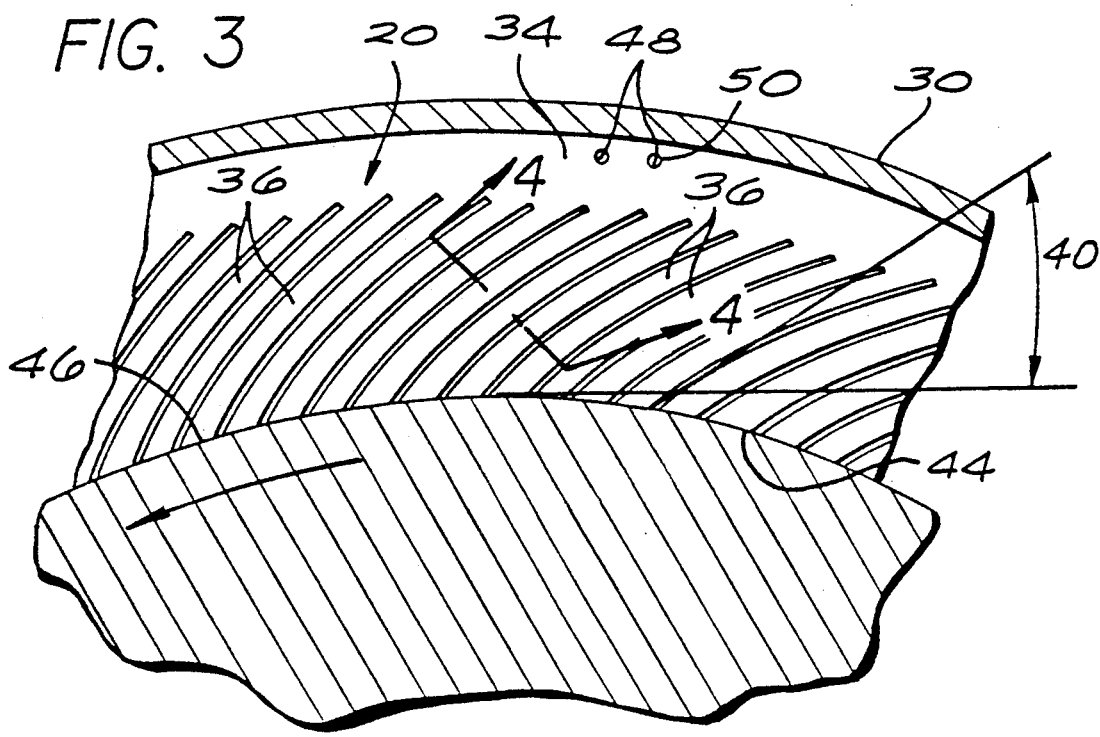

LAMINATED FINGER SEAL

The present invention is in the field of sealing apparatus and method disposed in association with two relatively rotatable members and providing a fluid seal therebetween. More particularly, the present invention relates to a method and apparatus for achieving a fluid seal between a rotatable shaft and a housing circumscribing the rotatable shaft and defining a running clearance therewith.

Sealing members, or fluid packing, of the so-called brush type for use at the interface of a housing and rotatable shaft have been known for a long time. For example, U.S. Pat. No. 885,032, issued to S. Z. De Ferranti on Apr. 21, 1908 (hereinafter, the '032 patent), is believed to teach a fluid packing or brush seal for use in an elastic turbine wherein a plurality of elongate filaments or fibers are clustered together and secured to one of a pair of relatively movable members for sliding contact with the other member. The resulting "brush" seal functions rather like a labyrinth or multi-baffle seal to inhibit fluid flow between the pair of relatively movable members. The '032 patent teaches that the brush seal may be made of metallic filaments or wire, for example, carried by one of the members and may be arranged as a radial or axial seal with a smooth or grooved engagement surface on the other of the pair of members. Consequently, the brush seal of the '032 patent is able to withstand high temperatures encountered in steam turbines or combustion turbine engines.

A more recent example of the brush seal is taught by U.S. Pat. No. 4,678,113, issued July 7, 1987, to S. A. Bridges and J. Goddard, (hereinafter the '113 patent). The '113 patent is believed to teach a brush seal wherein a plurality of filaments are adhesively intersecured to form a tuft. A plurality of tufts are assembled closely adjacent one another in a support member with part of each tuft projecting therefrom. The adhesive is removed from the projecting part of each tuft to leave the filaments individually movable and engageable with a rotatable shaft, for example. Again, the filaments may be made of wire so that the brush seal is suitable for high temperature applications.

Finally, a brush seal of multiple stages is taught by U.S. Pat. No. 4,756,536, issued July 12, 1988 to Bryan L. Belcher, (hereinafter, the '536 patent). This patent is believed to provide a multistage brush seal for use in a turbine engine wherein the fluid pressure differential imposed across the seal would result in the last seal stage allowing excessive leakage flow.

Each of the teachings of the '032, '113, and '536 patents proposes to use plural elongate filaments in making of the brushes of a brush seal. While the techniques and industry for making general purpose brushes at high volume and low cost are well advanced, brush seals remain fairly expensive. This may be the case because the manufacturing techniques for general purpose brushes are not applicable to brush seals. On the other hand, the historically low volume of brush seal use may not economically justify adaptation of high-volume, low-cost manufacturing equipment from the general brush field to the seal making industry.

Generally speaking, high temperature brush seals, as opposed to general purpose brushes, rely on a cluster of wires packed closely together to limit leakage flow therebetween, with the brush being thick enough to minimize the overall leakage rate. In manufacturing these brush seals, a persistant problem seems to be holding of the wires in place for welding their outer ends together into the housing ring of the seal device. After this welding operation, the inner ends of the wires in the brush seal must be ground to a finished inside diameter. Of course this multistep manufacturing process for conventional brush seals adds to their cost. What ever may be the economic and technical reasons, brush seals have not enjoyed a wide application, especially in the turbine engine field. Instead, the turbine engine field has historically relied upon sometimes complex knife-edge and labyrinth sealing structures.

On the other hand, as the demands for small sizes, increased power outputs, and improved specific fuel consumptions increase in the turbine engine arts, the brush seal becomes increasingly attractive. Such is the case because the brush seal can offer an improved sealing effectiveness, smaller size, and it is hoped, a decreased engine cost when compared to engine designs using conventional labyrinth seals.

In view of the above, it is an object for this invention to provide a brush-like seal which admits of manufacture by modern low-cost techniques.

Another object of the present invention is to provide a brush-type seal which offers improved sealing effectiveness in comparison with conventional brush seals.

Broadly stated, the objective for this invention is to provide a sealing device with more positive control of leakage flow than either conventional brush-type or labyrinth seals, and which can be manufactured with modern low-cost methods. A seal device according to the invention may in fact have such a low leakage flow that a controlled leakage is introduced to minimize wear of the sealing device. Modern low-cost manufacturing techniques which may be used to manufacture the present inventive sealing device include photo etching, wire electrical discharge machining, and laser cutting.

Accordingly, the present invention provides annular sealing apparatus for disposition in cooperation with a body defining a bore and a shaft member rotatably received in said bore to inhibit fluid leakage therebetween, said sealing apparatus comprising axially juxtaposed first and second comb-like pluralities of uniformly spaced and angulated integral finger members, circumscribing said shaft member, each finger member being of substantially the same width and said pluralities defining respective uniform gaps between adjacent finger members, an end surface of each of said finger members sealingly and movably engaging said shaft member, and said pluralities being so disposed that the fingers of each block the gaps of the other.

FIG. 1 depicts a longitudinal view, partially in cross-section, of a sealing apparatus embodying the invention;

FIG. 2 depicts an enlarged fragmentary sectional view of an encircled portion of FIG. 1;

Figure 4:
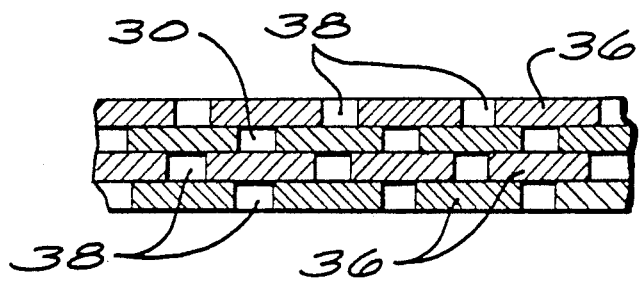
Figure 5:
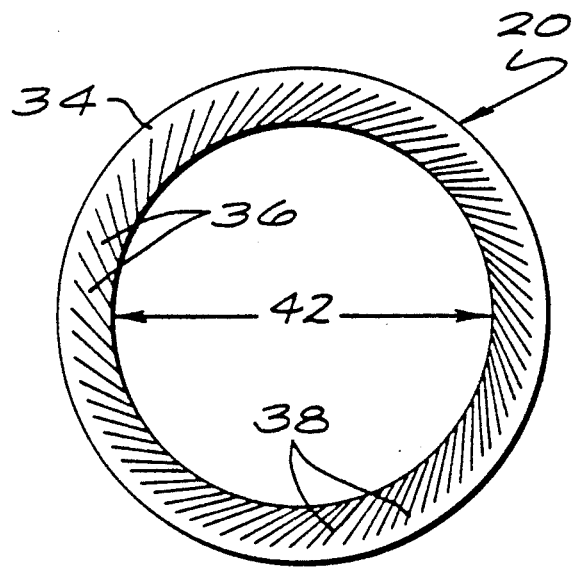
Figure 6:
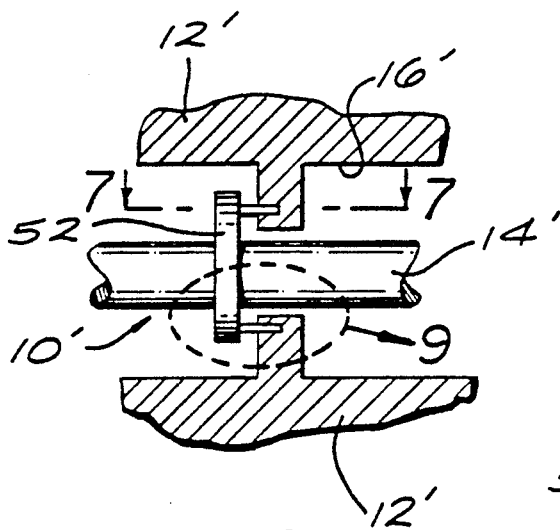

FIG. 2A presents an enlarged fragmentary view of an encircled portion of FIG. 2;

FIG. 3 depicts a transverse sectional view taken along line 3—3 of FIG. 2;

FIG. 4 provides an enlarged fragmentary cross-sectional view taken along line 4—4 of FIG. 3;

FIG. 5 is an isolated view of a component part of the sealing apparatus of FIGS. 1-3;

FIG. 6 depicts a longitudinal view, partially in cross-section, of a sealing apparatus according to an alternative embodiment of the invention.

Figure 7:
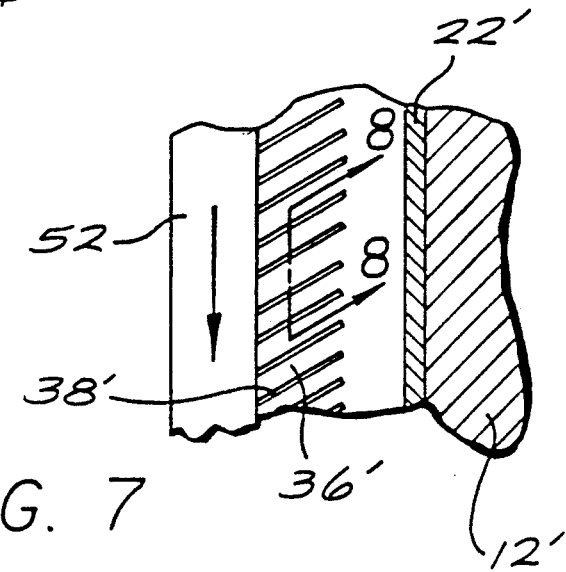
Figure 8:
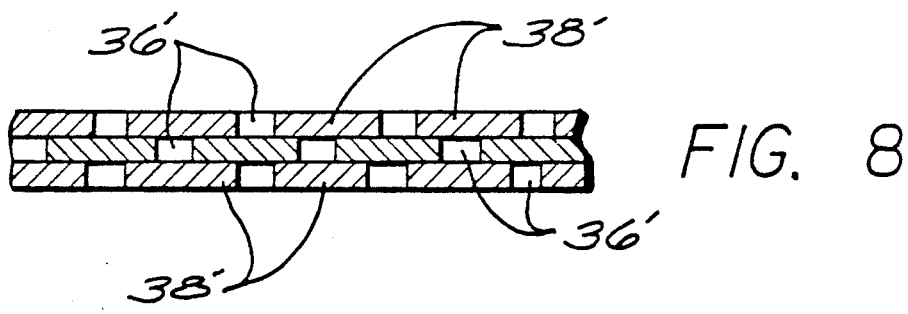
Figure 9:
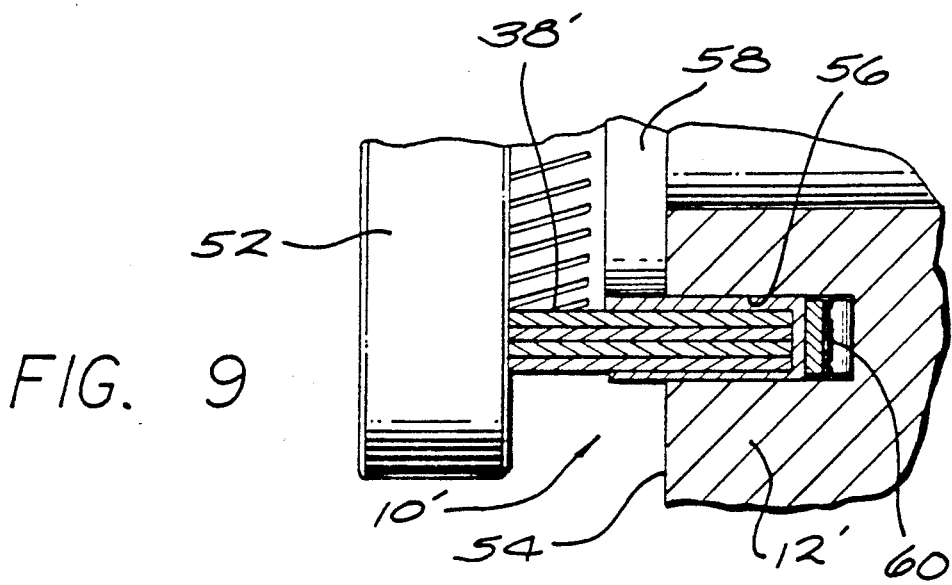

FIG. 7 provides an enlarged fragmentary view taken along line 7—7 of FIG. 6;

FIG. 8 is a fragmentary cross-sectional view taken along line 8—8 of FIG. 7; and FIG. 9 provides an enlarged fragmentary view of an encircled portion of FIG. 6.

Figure 10:
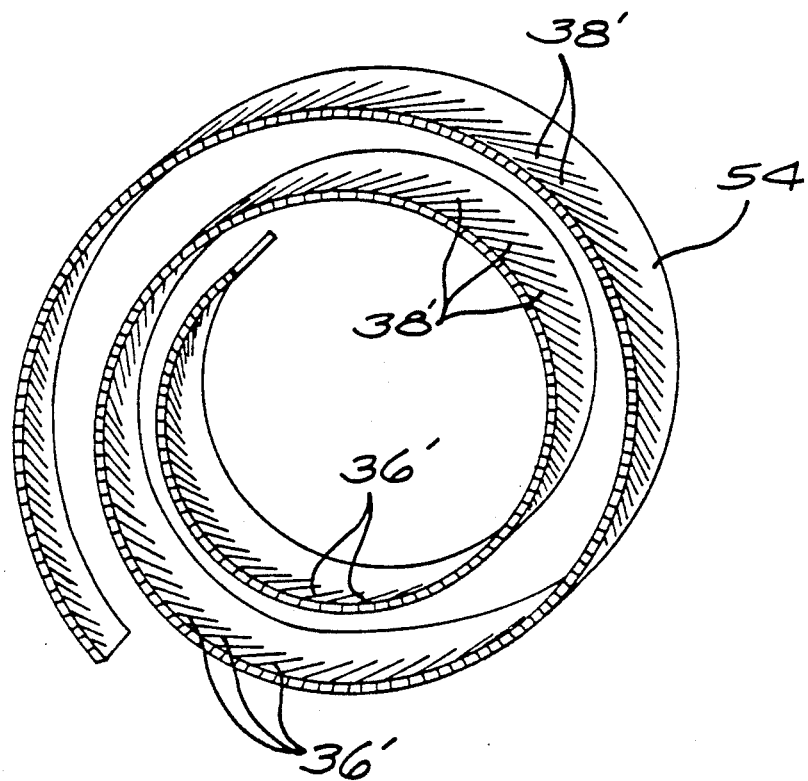

FIG. 10 schematically depicts a perspective view of a component part of the sealing apparatus depicted by FIGS. 6-9.

Viewing FIGS. 1-5 in conjunction, FIG. 1 shows a sealing apparatus generally referenced with the numeral 10. The sealing apparatus 10 is disposed in cooperation with a body 12 and a rotatable shaft 14 to provide a fluid seal therebetween. Particularly, the body 12 defines a bore 16 through which passes the rotatable shaft 14. The sealing apparatus 10 is carried by the body 12 at bore 16 and encircles the shaft 14 in sealing tight relatively movable relation therewith.

FIG. 2 shows that the sealing apparatus 10 includes an annular housing 18, which is carried by body 12 and extends toward but short of shaft 14. Carried within the housing 18 is a plurality of thin annular metallic diaphragm members 20. The housing 18 includes a first annular portion 22 which is L-shaped in cross-section to define a recess 24. Received in recess 24 is the plurality of diaphragm members 20. Also received in recess 24 is a second planar annular portion 26. Portion 24 includes a first radially extending leg 28 generally parallel with portion 26, and an axially extending leg 30 encircling the diaphragm members 20 and second portion 26. At a radially outer margin 32 of the second portion 26, the portions 22 and 26 are welded together to trap the diaphragm members 20 therebetween. Importantly, the portions 22 and 26, at their axial surfaces confronting the plurality of diaphragm members 20, diverge as they extend inwardly over a portion of their radial dimension to allow a limited relative movement of axially adjacent parts of the individual diaphragm members 20. In other words, the portions 22 and 26 of housing 18 clamp the diaphragms therebetween at their as they extend outer margin, but diverge slightly (in the range of 0.3 degrees) radially inwardly to allow slight relative movements of parts of the diaphragm members. This divergence of the portions 22 and 26 is to avoid axially pinching the diaphragm members adjacent the shaft 14.

The diaphragm members 20 each extend to and slidably engage the shaft member 14, viewing FIGS. 2 and 3 in particular. As seen in FIGS. 3 and 5, each diaphragm member includes a circumferentially continuous band portion 34 which is adjacent the radially extending leg 28 of housing portion 22. The diaphragm members 20 each define an integral plurality of circumferentially uniformly arrayed finger portions 36. The finger portions are comb-like and are circumferentially spaced apart to define a uniform gap 38 therebetween. These finger portions also extend radially and angularly in a single circumferential direction to define at their contact with the surface 46 of shaft 14 an angle with the tangential, which angle is referenced with the numeral 40. That is, the finger portions 36 extend radially inwardly from the band portion 34 generally like a comb toward the shaft with a left-hand or right-hand circumferential angulation. As seen in FIG. 3, the finger portions 36 have a left-hand angulation. However, if viewed axially from the opposite side, the diaphragm member 20 would present finger portions with a right-hand angulation. Also, the gap 38 is narrower than the finger 36. In their unrestrained positions, as depicted in FIG. 5, the finger portions 36 cooperatively define an inner diameter, referenced with the numeral 42, which is slightly less than the outer diameter of shaft 14.

FIG. 2A depicts the engagement of fingers 36 at their end surfaces 44 with the outer surface 46 of shaft 14. As depicted in FIG. 2A, the fingers 36 define a contracting end surface portion 44 resting on the shaft 14 at surface 46, and a chamfer surface 44a. The chamfer surfaces 44a are disposed on the higher pressure side of the sealing apparatus 10 (leftside, viewing FIGS. 1, 2 and 2A). Recalling that the gaps 38 extend axially between the circumferentially adjacent fingers 36, it is easily appreciated that the chamfers 44a cooperatively provide a circumferential controlled leakage path at each diaphragm 20. Because of the gaps 38 and chamfers 44a, a controlled leakage flow is allowed to pass through the sealing apparatus 10. However, this leakage flow also provides for the creation of a hydrodynamic bearing film at the surfaces 44 of each finger 36. The applicants believe that wear of the sealing apparatus 10 will be greatly reduced because of the creation of a fluid film between surfaces 44 and 46, at the expense of a small controlled leakage of fluid past the sealing apparatus.

Consequently, when the diaphragm members 20 are received about the shaft 14, each finger 36 is deflected slightly from its unrestrained position to lightly press an arcuate end edge surface 44 against the outer surface 46 of shaft 14. Preferably, the outer surface 46 of shaft 14 is hard coated to reduce wear. As is easily appreciated, when shaft 14 rotates leftwardly (counter clockwise, viewing FIG. 3), the tangential friction force at surface 46 provides a moment to finger portion 36 tending to decrease the perpendicular contact force between the surfaces 44, 46. Thus, the shaft 14 is rotatable counter clockwise with the finger portions 36 maintaining a smooth sliding contact with surface 46. On the other hand, should the shaft 14 rotate clockwise, the frictional force adds to the perpendicular force. However, the angle 40 is chosen in view of the bending strength of the finger portions and the coefficient of friction at surfaces 44, 46 so that a smooth sliding contact is maintained at surfaces 44, 46 regardless of the direction of rotation of shaft 14. That is, the fingers 36 do not dig into or grab the shaft 14 regardless of rotational direction of the latter.

Each of the plural diaphragm members 20 defines a pair of circumferentially spaced indexing apertures 48. The spacing between apertures 48 is an odd integer multiple of one-half the circumferential spacing of fingers 36. Consequently, axially adjacent diaphragm members may be circumferentially alternated by passage of a single indexing pin 50 through alternate ones of the pair of indexing apertures. The indexing pin 50 is also received in a retention hole, not shown, in each of the housing portions 22 and 26 to prevent relative rotation of the diaphragm members 20.

FIG. 4 illustrates the advantageous cooperative effect of the indexed circumferential orientation of adjacent diaphragm members 20. It is easily seen that because the gaps 38 are considerably narrower circumferentially than are the finger portions 36, the gaps of each diaphragm member are blocked axially by the finger portions of the axially next adjacent diaphragm member. Consequently, the axially successive finger portions act as a positive seal to prevent axial passage of fluid.

During rotation of the shaft 14, it is believed that a thin fluid dynamic film will form at surfaces 44, 46 so that wear of the fingers 46 and grooving of shaft 14 will be minimal. The surface 46 of each finger 36 may be coated with a wear-resistent material, such as chromium carbide, to minimize wear during start-up of rotation of shaft 14 prior to the fluid film being established at surfaces 44-46. Also, the radial compliance of the finger portions 36 is sufficient to easily accommodate all vibratory excursions or maneuver load deflections of shaft 14.

FIGS. 6-10 depict an alternative embodiment of the invention which will be easily understood in view of the foregoing description of FIGS. 1-5. In order to obtain reference numerals for use in describing the embodiment of FIGS. 6-9, features which are analogous in structure or function to features of FIGS. 1-5 are referenced with the same numeral used previously, with a prime added thereto.

The sealing apparatus 10' of FIG. 6 is disposed axially between a body 12 and a radially extending collar portion 52 of the shaft 14'. As seen in FIG. 7, the sealing apparatus 10' includes multiple axially extending and angulated finger portions 36'. The finger portions 36' slidably engage the collar 52 to allow rotational relative movement of shaft 14'. FIG. 8 illustrates that the seal apparatus 10' includes plural radially juxtaposed rows of the fingers 36' which cooperatively define a circumferentially extending seal with the collar 52.

Importantly, FIG. 10 illustrates that the plural radially juxtaposed rows of finger portions 36' are provided by a spiral wrapping of a single elongate strip member 54. The strip member 54 is spirally wrapped on itself so that radially adjacent wraps provide the rows of finger portions 36'. Preferably, the width of each finger portion 36' is substantially greater than the width of the gaps 38'. Consequently, the occurrences of a gap 38' in one wrap of strip 54 communicating with a gap 38' in a next radially adjacent wrap of the strip are minimized.

As with the embodiment of the invention depicted by FIGS. 1-5, the seal apparatus 10' defines a circumferential angulation for the fingers 36' which allows rotation of shaft 14' in either direction without digging or grabbing of the finger portions into the shaft 14'. However, the finger portions 36' may extend purely axially without circumferential angulation. It is believed that the axially extending non-angulated finger portions will not vibrate or skitter so that a smoothly sliding and sealing relation is maintained with collar 52. Thus, it will be appreciated that a standard stock of the strip seal material may be employed in making seal apparatus 10' of varying sizes.

FIG. 9 illustrates that the sealing apparatus 10' is axially slidably received into an axially disposed blind annular groove 56 defined by the housing 12'. The sealing apparatus 10' includes an annular band member 58 which is U-shaped in cross section, and which receives therein the spiral wrap of strip material 54. The band member 58 is closely slidably received into the groove 56 to trap therein an annular resilient wave-washer type of spring, which is referenced with the numeral 60. The spring 60 urges the sealing apparatus 10' axially out of groove 56 and into sealing engagement with the collar portion 52 of shaft 14'. The sealing apparatus 10' is thus axially movable both toward collar 52 to compensate for wear of the finger portions 36', and with collar 52 to allow for limited axial movement of shaft 14 relative to housing 12.

Further to the above, the two embodiments of the invention herein presented share features which allow low cost manufacturing thereof. For example, the diaphragm members 20 and strip member 54 may be made of a thin sheet or strip stock of shape-retaining or springy metal. The manufacturing methods used may include photoetching, wire electrical discharge machining, and laser cutting. However, photoetching is the preferred method of manufacturing. The laser cutting or photoetch process may directly accept design information from a CAD/CAM system. The result is a seal apparatus which may be produced from design parameters and information in a short time and with very little or no specialized tooling. Those component parts of the seal apparatus which are not made by the photoetch process, for example, the housing portions 22 and 26, can be inexpensively made with standard tooling.

The choice of material depends on the application. For high temperatures, the preferred material would be Inconel X750. For lower temperatures, any of the Inconnel 600 series would suffice. Generally speaking, alloys with high molybdenum content would be preferred for wear resistance and low friction. In some cases, coatings such as PS200 (A composition developed by NASA) may be beneficial. For temperatures below 300° F., Polymide (plastic) diaphragms may be adequate.

What is claimed is:

1. Annular sealing apparatus for disposition in cooperation with a body defining a bore and a shaft member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members, said pluralities of finger members circumscribing said shaft member, said finger members defining gaps therebetween, an end surface of each of said finger members sealingly and moveably engaging said shaft member, and said pluralities of finger members being so disposed that the fingers of each block the gaps of the other.

2. The annular sealing apparatus of claim 1 wherein said first and second pluralities of finger members are each annular and are axially juxtaposed, said finger members extending radially and circumferentially from said body to engage said shaft member.

3. The annular sealing apparatus of claim 2 further including an annular housing defining a recess wherein is received a radially outer portion of said first and second pluralities of finger members.

4. The annular sealing apparatus of claim 3 wherein said body carries said housing.

5. The annular sealing apparatus of claim 2 wherein said housing includes a pair of substantially parallel radially extending leg portions capturing therebetween said radially outer portion of said pluralities of finger members, said leg portion slightly diverging as they extend inwardly from said outer portion to define a separating angle therebetween.

6. The annular sealing apparatus of claim 5 wherein said separating angle is substantially 0.3 degree.

7. The annular sealing apparatus of claim 2 wherein each of said first and second pluralities includes a respective annular band portion which is circumferentially continuous and integral with the finger members of the respective plurality.

8. The annular sealing apparatus of claim 2 wherein each of said pluralities of finger members defines a circumferentially extending chamfer at said end surface of said finger members.

9. The annular sealing apparatus of claim 8 wherein said sealing apparatus has a high-pressure side and a low-pressure side, said circumferentially extending chamfer at each of said plurality of finger members being disposed on said high-pressure side, said chamfers cooperating with said gaps between adjacent finger members to define a tortuous controlled leakage path through said sealing apparatus.

10. The annular sealing apparatus of claim 1 wherein said first and second pluralities of finger members are integral with one another.

11. The annular sealing apparatus of claim 10 wherein said first and second pluralities of finger members each extend axially and circumferentially from said body to engage said shaft member, said shaft member defining a radially outwardly extending collar having an axially disposed face engaged by said finger members.

12. The annular sealing apparatus of claim 11 wherein said seal apparatus includes a single elongate strip portion integrally defining each of said first and second pluralities of finger members.

13. The annular sealing apparatus of claim 12 wherein said strip portion defines said first and second pluralities of finger members adjacent one another along the length of said strip portion, said first and second pluralities of finger members being delimited within respective radially overlapping spiral wraps of said elongate strip portion.

14. The annular sealing apparatus of claim 13 wherein said sealing apparatus includes an annular housing which is U-shaped in cross section to define an axially disposed recess receiving said strip portion.

15. The annular sealing apparatus of claim 14 wherein said body defines an axially disposed groove confronting said axially disposed face of said collar portion, said sealing apparatus being axially slidably received at said housing thereof into said axially disposed groove.

16. The annular sealing apparatus of claim 15 wherein a resilient member is disposed in said groove and urges said sealing apparatus axially into sealing engagement with said collar face.

17. The annular sealing apparatus of claim 1 wherein said finger portions each define a width dimension at least twice the gap dimension, said finger portions generally being aligned with the gaps of the adjacent plurality to define with the finger members thereof a positive seal circumscribing said shaft member and inhibiting flow of fluid therethrough.

18. An annular sealing apparatus for disposition in sealing cooperation with a body defining a bore and a rotatable shaft received in said bore, said sealing apparatus including a pair of axially adjacent annular diaphragm members carried by said body and circumscribing said shaft member, each of said pair of diaphragm members including a respective radially outer circumferential band portion and a circumferential plurality of radially and circumferentially extending finger portions integral with said band portion and extending therefrom to each terminate in a respective radially disposed end surface which slidably engages said shaft member, said finger portions being circumferentially spaced to define an array of axially extending gaps therebetween, and said pair of diaphragm members being circumferentially indexed so the finger portions of each block the gaps of the other.

19. An annular sealing apparatus for disposition in sealing cooperation with a body defining a bore and a rotatable shaft member received in said bore, said shaft member including a radially outwardly extending collar portion defining an axially disposed face engageable by said sealing apparatus, said sealing apparatus comprising an elongate strip member wrapped spirally about said shaft member in axial confrontation with said face of said collar portion, said strip member including a band portion and an integral plurality of comb-like finger members extending axially from said band portion to each terminate in an axially disposed end surface which slidably engages said collar face, said finger members being spaced apart to define a respective plurality of gaps extending radially therebetween, and successive spiral wraps of said strip member radially overlying one another so the finger members of each substantially block the gaps of the other.

* * * * *